United States Patent Office 3,516,568
Patented June 23, 1970

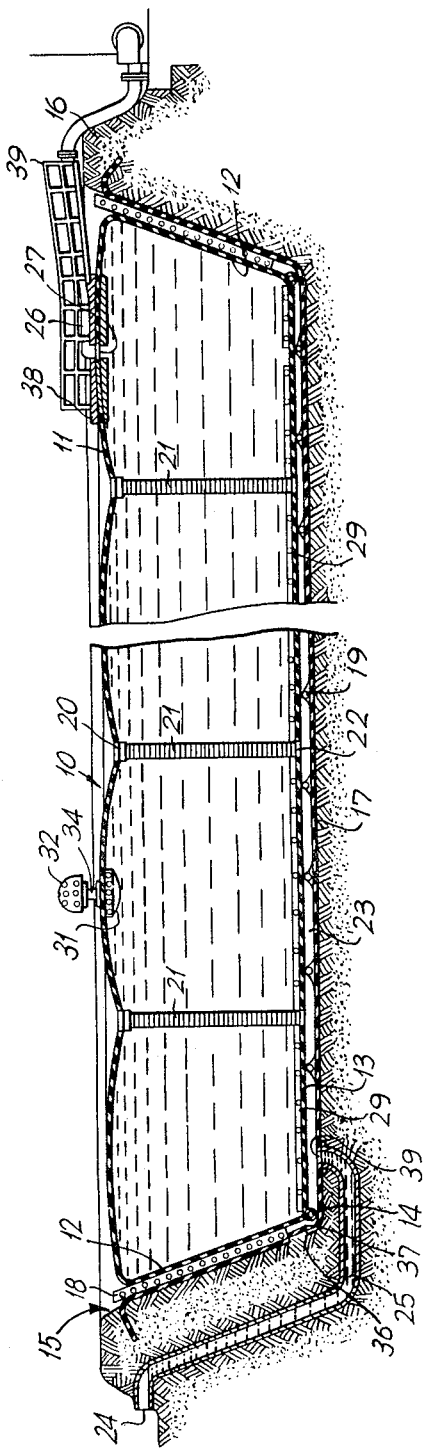

3,516,568
STORAGE OF LIQUIDS
Daniel Cecil Edward Fish, Ightham, near Sevenoaks, England, assignor to National Research Development Corporation, a corporation of Great Britain
Filed June 29, 1967, Ser. No. 650,058
Claims priority, application Great Britain, July 1, 1966, 29,634/66
Int. Cl. B65d 25/24
U.S. Cl. 220—18                                      11 Claims

ABSTRACT OF THE DISCLOSURE

An installation for storing liquid, comprising a tank of flexible sheet material located in a pit lined with waterproof sheet material and a layer of liquid, of a density not less than that of the stored liquid, between the bottom of the tank and the lined bottom of the pit. Flexible ducts are provided in the tank to drain rain-water off the top of the tank to the liquid layer beneath the tank.

---

The present invention relates to the storage of liquids, such as oil or water.

It is already known to store liquids in tanks made from flexible sheet material in which the hydrostatic pressure of the stored liquid is resisted by hoop stresses in the flexible sheet material of the tank. The storage capacity of these known tanks is limited by the strength of the material of which they are constituted, and where it is desired to provide a tank of large storage capacity, a strong and therefore heavy and expensive material must be employed.

In known tanks formed of flexible sheet material and of the order of 300 cubic metres capacity, the flexible sheet material has to have a tensile strength of the order of 1000 lbs. per inch width. Material of this order of strength tends to be expensive, and to be so heavy as to offset, at least to some extent, the advantages of such tanks as regards portability.

According to one aspect of the present invention, there is provided an installation for storing liquids, comprising means defining an upwardly-open recess and a tank for the liquid to be stored, the tank being received within the recess and having top, side and bottom walls of flexible sheet material, and liquid within the recess beneath the bottom wall of the tank.

According to another aspect of the present invention, there is provided a tank for use in an installation as described in the immediately preceding paragraph, the tank having top, side and bottom walls of flexible sheet material, the material of the side walls being of a strength less than that which would be required to resist forces thereon due to liquid stored in the tank if the side walls of the tank were not supported in use.

In those cases where the density of the liquid beneath the bottom wall of the tank is in excess of the density of the liquid to be stored, the liquid beneath the tank is in the form of a substantially continuous layer thereby providing a smooth surface for contact by the bottom wall of the tank even though the bottom of the recess, which may be a pit excavated in the ground, may not be smooth and may contain imperfections which, if the bottom of the pit were supporting the bottom wall of the tank without the intermediary of the liquid, would stress the material of the bottom wall of the tank and the bottom wall would therefore have to be made fo stronger material in order to resist such stresses.

In those cases where the density of the liquid beneath the bottom wall of the tank is approximately equal to but less than the density of the liquid to be stored, liquid introduced into the recess prior to filling the tank will in part be displaced from beneath the bottom wall of the tank, but some of the liquid will remain in any depressions there may be in the bottom surface of the recess thereby serving to support and reduce the stresses which would otherwise be present in the material of the bottom wall of the tank in the absence of the liquid.

In cases where the density of the liquid beneath the bottom wall of the tank is in excess of the density of the liquid to be stored, because the outwardly directed forces exerted by the stored liquid on the bottom wall are opposed and balanced by the inwardly directed forces exerted by the liquid in the layer on the bottom wall and because the outwardly directed forces exerted by the stored liquid on the side walls are opposed and balanced in part by the sides of the recess and in part by the inwardly directed forces exerted by liquid outside the tank within the recess on the walls the material may be considerably weaker and therefore less expensive than the material employed in the previously known tanks referred to above.

In cases where the density of the liquid outside the tank is in excess of the density of the liquid to be stored, when the tank contains liquid, some of the liquid initially beneath the tank is displaced upwardly around the side walls of the tank. Thus, since the entire bottom of the tank is in contact with a layer of liquid and since at least a large portion of the walls of the tank are in contact with liquid, any leakage of the tank may readily be detected by testing the layer liquid, since leaked stored liquid will rise in the liquid outside the tank. This ability to detect leakage of the tank is of great advantage in those cases where the stored liquid is such that escape of any of the liquid would create an undesirable contamination of or fire hazard in the surroundings of the installation.

The presence of liquid over the entire bottom of the recess at least at the commencement of filling of the tank enables the bottom wall of the tank to move so that local stresses, for example due to folds in the bottom wall of the tank, can be relieved. Similarly, as liquid initially beneath the bottom wall is displaced upwardly around the sides of the tank, the straightening of any folds in the side walls is facilitated by the presence of the liquid thereby serving to relieve stresses in the material of the side walls.

Normal operational loads which the material of the walls must be strong enough to resist are the stresses which the material of the tank will need to bear during manufacture, handling, transportation and use in the installation, including, in some cases, inspection by workers supported by the top wall of the tank. The normal operational loads are likely to be considerably less than the loads normally expected during the use of the previously proposed tanks, and consequently, weaker and lighter-weight material may be employed in the tank, with benefit in the capital cost of the tank and its portability. For the sizes of tank and installation according to the invention, the cost of providing a recess to receive the tank is more than off-set by the cost advantages resulting from the use of weaker material.

Preferably, the tank is provided with at least on flexible rain-water drainage duct providing a passage through the tank from the top wall to the bottom wall thereof, and sealed from the interior of the tank so that rain-water which has fallen on the top wall can drain through the tank to the bottom of the recess. The rain-water drainage duct or ducts is intended to prevent the formation of rain-water puddles on the top wall, since these would depress the top wall, when there is stored liquid in the tank, setting up stresses which would otherwise provide a risk of damage to the tank. The rain-water drainage duct may have a weight sufficient to ensure that when liquid is stored in the tank, the entrance to the rain-water drainage duct is depressed below the general level of the top wall so that any rain-water on the top wall flows towards the said entrance.

The recess may be provided at least in part by a pit in the ground, either natural or excavated, and alternatively, or additionally, the sides of the recess may be defined, at least in part, by earth walls. The earth walls may be of material which has been excavated from the pit. When considered necessary, the recess may be lined with a material which is impervious to the liquid in the said layer so that the liquid layer substantially does not seep away.

There may be means for venting to atmosphere any gases which collect inside the tank above the stored liquid, and the said top wall may have an aperture through which the oil can be supplied to and removed from the tank. There may be elongate members such as rods or tubes (which may be perforated) radiating towards the side walls of the tank from the vicinity of the said aperture so that as the tank is emptied, the top wall is prevented from co-operating with the bottom wall, at least in the region of said elongate members, and from forming a pocket, which is sealed from the aperture.

Preferably, the elongate members are formed of a material having a density similar to that of the liquid which is to be stored so that if the elongate members should rest on the bottom wall of the tank, the weight to be supported by the bottom wall will be as small as possible, and the strength requirement of the bottom wall will be as small as possible.

Discrete passages may be provided between the side walls of the tank and the sides of the recess, e.g. by means of pipe located in vertical planes, which upwardly extend from the layer liquid, so that samples of the layer liquid, or the air above it, can be examined for traces of stored liquid indicative of a leak or other imperfection in the tank. Displaced layer liquid will also rise in the rain-water drainage ducts, and may also be investigated for traces of stored liquid.

The invention will now be described, by way of example only, with reference to the accompanying drawing which illustrates a vertical cross-section of an installation for storing oil, the installation being depicted with its storage capacity in full use.

The installation comprises a pit 15 of rectangular form in plan formed in the ground, As depicted, the pit 15 is continued above the general ground level by the provision of earth walls 16. If the pit 15 has been artificially excavated, as in the illustrated embodiment, the earth walls 16 may conveniently be formed form earth excavated from the pit 15.

The side walls of the pit 15 are suitably sloped outwardly so that they will not collapse.

The pit 15 has a lining 17 of water-impermeable sheet material and the marginal portions of the lining 17 are embedded in the earth wall 16 to prevent damage to them and to anchor the lining 17. Since, in the embodiment presently being described, the lining 17 is normally only exposed to water, it may be formed from relatively cheap materials such as polyethylene, polyvinyl chloride or butyl rubber. However, it may be found desirable for the lining material to be resistant also to the stored liquid. A quantity of water, which may be rain-water, river water, town water or sea water, is provided in the pit 15 so as to form a layer 23 above the lining 17 which is sufficiently deep to cover any irregularities in the lining 17 due to irregularities in the bottom of the pit 15.

A tank, generally indicated by reference numeral 10, and rectangular in plan, is received in the pit 15 generally above the water layer 23. The tank 10 has a top wall 11, side walls 12 and a bottom wall 13. The top wall 11 and side walls 12 are formed from a flexible sheet material which is unaffected by the oil to be stored (for example, nylon fabric coated with synthetic rubber when the oil is a gasoline fraction). Since the side walls of the tank are supported, weaker material may be used for the side wall than was possible in previously known flexible tanks wherein the side walls were not supported and the side walls consequently had to be formed of a material sufficiently strong to resist the hydrostatic forces exerted by the stored liquid. The bottom wall 13 is formed of flexible sheet material resistant to water and to the oil to be stored. In the instance where the oil is gasoline, the bottom wall may be of, for example, nylon coated with a co-polymer of polyvinyl chloride and nitrile rubber. As illustrated, the bottom edges of the side walls 11 have a beading 14 enclosing a tube containing ballast, which may be, for example, moist sand. The ballast serves only to maintain the tank 10 with its top wall uppermost and, in certain circumstances, e.g. where the density of the stored oil approaches that of the water in layer 23, the ballast may not be necessary.

The top wall 11 of the tank 10 has a plurality of heavy apertured flanges 20 which form the upper ends of rain-water drainage ducts 21 of flexible hose. The lower ends of the drainage ducts 21 are sealed to the peripheries of apertures in the bottom wall 13 and are open to the water layer 23. The weight of the flanges 20 ensures that when the installation is in use, the top wall 11 will be depressed in the region of the flanges 20 and any rain-water on the top wall 11 will readily flow towards the depressed regions and drain via the ducts 21 into the water layer 23. In the absence of such provision for rain-water drainage, there would be a risk that puddles would form on the top wall 11, and the weight of water in the puddles would strain and possibly damage the top wall 11.

Any gases which may be trapped in the tank 10 can be vented through one-way vent-valves (not visable) disposed in radially-apertured floats 31 (one of which is illustrated in the drawing) which allow the gases to pass to atmosphere through venting pipes 34 in the top wall 11, and flame-traps 32. Each float 31 is radially aperture so that gases trapped on the underside of the top wall 11 can escape without there being any substantial risk that the apertures will be blocked by folds in the material of the top wall 11.

The tank 10 is provided with a raft 38 which, in the present embodiment is located above and attached to the top wall 11. The raft 38 comprises a lower section formed of hollow welded steel members disposed immediately below the top wall 11, and an upper section of sheet steel foot-boards, disposed immediately above the top wall 11, the two sections of the raft being bolted together by bolts (not shown) extending through the top wall 11 of the tank 10. The hollow members forming the lower section impart buoyancy to the raft 38 so that the top wall 11 is not weighted down thereby when the tank 10 is full. The tank 10 is filled and emptied from an oil supply line 26 which is supported by the raft 38 and a gangway 39 extending between the earth walls 16 and the raft 38. The supply line 26 terminates in a connection flange 27 which passes through the raft 38 and the top wall 11 of the tank 10. Instead of being located above the top wall, the raft may be located within the tank.

Besides supporting the oil supply line 26 and the connection flange 27, the raft 38 and the gangway 39 also enable the top wall 11 of the tank 10 to be inspected. A series of rafts similar to raft 38 may be provided at intervals over the top wall 11 and connected by gangways so that the whole of the top wall 11 may be conveniently supervised.

Each raft 38 may incorporate a manhole (not shown) which is in register with a hole in the top wall 11 of the tank 10 so that sample of the stored oil may be taken. When the tank 10 is empty of oil, it may be inflated by pressurised air and the inside inspected by workmen who have entered the tank 10 through the manhole(s). Usual precautions are taken in respect of the atmosphere which may be explosive and/or noxious. Since the area of the top wall 11 will be very large and in view of the light weight of the material, in practical installations (for example 50 yards by 70 yards), a very low air pressure will suffice to inflate the tank 10 and to support the top wall 11 and the rafts and gangways.

When the installation is to be used for storing oils which require heating before they can be satifsactorily pumped, there may be provided heating coils heated by steam which depend from the raft 38 into the interior of tank 10 in the vicinity of the connection flange 27. The steam-supplying hoses are carried by the gangway 39 and raft 38. During operation, the heated oil rises, and may then be conveniently pumped out of the tank via the connection flange 27. Alternatively, the supply line 26, which is also used for pumping out the stored oil, may be heated adjacent the tank or heating coils may be placed in the water layer 23 beneath the tank or the layer water may be heated in other manners.

When the tank 10 is empty, the top wall 11 lies against the bottom wall 13 and the side walls 12 are crumpled against the side walls of the pit 15. Those parts of the tank 10 containing unvented gases, such as air, float on the water layer 23 while other parts are partly or wholly submerged.

Let it now be assumed that the density of the oil to be stored is less than the density of the water within the recess outside the tank. When oil is pumped into the tank 10, it spreads throughout the tank, raising the top wall 11 relative to the bottom wall 13. The tank 10 eventually becomes wholly buoyant, and rests above the water layer 23. As the tank is filled, it displaces water from the water layer 23 into the region between the side walls 12 of the tank and the lining 17 on the sides of the pit 15 so that the hydrostatic head of water in this region balances the hydrostatic head of oil in the tank 10. It is to be appreciated that the oil in the tank 10 presses the side walls 12 outwardly against the lining 17, and hence the quantity of water from layer 23 which can intrude between the side walls 12 and the lining 17 is very small. Thus, even when the tank 10 has been filled with oil, the quantity of water displaced from layer 23 is so small that the height of the bottom wall 13 above the bottom of the pit 15 substantially has not altered since the tank 10 was empty. Accordingly, the bottom wall 13 is free from the stresses which would otherwise occur were the quantity, and hence depth, of water in layer 23 to vary substantially. In order to ensure that water can be displaced from the layer 23 into the region between the side walls 12 of the tank 10 and the lining 17, there may be provided, as shown, a number of short lengths of pipe or rod 19 which extend under the beading 14, and thus produce folds or wrinkles in the side walls 12 which act as channels for the water. Water from layer 23 is also displaced into the rain-water drainage ducts 21 to the same height as the water surrounding the side walls 12 of the tank 10, but in this respect also, the quantity of water lost from layer 23 is so negligible as not to affect the disposition of the bottom wall 13.

The lining 17 at the bottom of the pit 15 is apertured at 39 so that the pit 15 communicates with an overflow pipe 25. The level of the open end 24 of the overflow pipe 25 determines the maximum level which the water from layer 23 can attain. Thus, in the event of prolonged heavy rain, rain-water reaching layer 23 through the drainage ducts 21 would cause a volume of water, equal to the volume of rain-water, to flow out of the overflow pipe 25. The provision of the overflow pipe 25 ensures that the tank 10 is not raised by water accumulating in layer 23 to such a height that any part of it is higher than the top of the walls 16 of the pit 15. The open end 24 of the overflow pipe 25 is at a level below the top level of the lining 17 so that water cannot rise above the lining 17 and then seep into the earth walls 16 and damage them. Installations according to the present invention may be provided with one or more overflow pipes 25 each having an outlet 24 the vertical height of which can be adjusted to take account of the relationships of the densities of the stored liquid and of the layer liquid.

When the tank 10 is full, as illustrated, the outwardly directed forces on the side walls 12 are zero at the level of the top wall 11 and increase downwards linearly as far as the level of the displaced water between the side walls 12 and the lining 17. Between the level of the top wall 11 and the level of the displaced water the outwardly directed forces are opposed by reaction against the walls of the recess. Thereafter, the outwardly directed force on the side walls due to the hydrostatic head of oil in the tank 10 is countered, in a degree which increases with depth, by the inwardly directed force due to the hydrostatic head of the water, and at the level of the bottom wall 13 where the oil and water hydrostatic heads are equal, the outwardly directed forces on the side walls are entirely balanced by the inwardly directed forces exerted thereon by the layer liquid, there being no reaction against the walls of the recess.

It is to be appreciated that the side walls of the tank are supported throughout their height, in part by reaction with the walls of the recess and in part by displaced layer liquid. The maximum reaction with the walls of the recess occurs at the level of the displaced water and this reaction is equivalent only to the head of oil above the level of the displaced water. Thus, since the side walls are supported throughout their height, they may be formed of material which is weaker than that which would be required if the walls of the tank were unsupported. Also, if the walls of the recess are not smooth, the material of the side walls may be weaker than would be required to prevent ruptures of the side walls due to irregularities of the recess surface, which ruptures might occur in the absence of the displaced water, which, in effect, provides a smooth support for the tank side walls. The reaction between the side walls of the tank and the side walls of the recess is, in the case where the densities of the stored and outside liquids are closely similar, in no region so high as to prevent any folds in the material of the side walls 12 from being straightened as the tank 10 is filled.

The material of the bottom wall may be very weak since it is in contact substantially only with liquids and the hydrostatic forces on its opposite faces are balanced. In effect the botom wall constitutes only a membrane separating the stored and layer liquids.

The lining 17 at the side of the pit 15 near the bottom thereof has an aperture 36 which is closed by a hinged flap 37 of waterproof flexible sheet material. The flap 37 acts as a valve and is hingedly attached to the lining 17 by its upper edge so that it is normally held closed by the water in layer 23. If the level of the water table in the surrounding ground should rise above the maximum level of the water in the pit 15, there is a risk that the lining 17 might be lifted from the bottom of the pit 15. However, in such circumstances, the flap 37 is moved away from the lining 17 by the pressure of the water in the ground, thus allowing a flow of water to take place until the heads of water inside and outside the lining 17 are substantially equalised, so that the lifting forces acting on the lining 17 are eliminated, at which time the flap closes. The aperture 36 and flap 37 are disposed above the bottom of the pit 15 so that if the flap 37 should fail to close the aperture 36 when the ground water level has fallen below the level of the water layer 23, there would always be enough water in the layer 23 to prevent substantial contact between the bottom wall 13 of the tank 10 and the lining 17 at the bottom of the pit 15.

Where there is unlikely to be any tendency of the ground water to enter or leave the pit 15, e.g. because the ground is already water-logged or totally impervious, the lining 17 may be dispensed with. For more permanent installations, the pit 15 may be lined instead with concrete or asphalt or clay in which cases no aperture 36 and flap 37 would be necessary.

As shown, a plurality of rigid perforated pipes 18 are disposed in vertical planes in spaced-apart locations between the side walls 12 of the tank 10 and the lining 17. The rigid pipes 18 rest at their lower ends on the bottom of the recess and may be secured at their upper ends to the walls of the recess. Water which has been displaced from layer 23 to the region between the side walls 12 of the tank 10 and the lining 17 passes into the pipes 18 so that the level of the water in the pipes 18 is the same as the level outside the pipes 18. In the event of a leakage of oil from the tank 10, a film of oil spreads over the surface of the water between the side walls 12 of the tank and the lining 17, and the film will be detectable by taking samples from the water in the rigid pipes 18 or from the air immediately above the water. It will be realised that if the water layer were to be omitted and hence the lining were also omitted, any leakage would spread into the surrounding ground and would contaminate the surrounding ground and possibly also water sources and could also constitute a fire hazard. Also, there would be no ready manner of detecting leakage. In instances when the tank 10 has no ballast in the beading 14, the side walls 12 of the tank 10 may be sufficiently wrinkled by the rigid pipes 18 to allow communication between the water layer 23 and the space between the side walls 12 of the tank 10 and the lining 17, and the previously mentioned lengths of pipe or rod 19 may be dispensed with.

When the tank 10 is being emptied, the top wall 11 sinks towards the bottom wall 13 while the side walls 12 crumple and fold, and the rain-water drainage ducts 21 flex from the substantially straight configuration they have in the full tank 10, as illustrated. When the tank 10 is nearly empty, there is a possibility that the top wall 11 might cooperate with the bottom wall 13 and seal off pockets of oil. This is undesirable since it would then not be possible to remove all the oil from the tank 10, and there would always be a potential fire risk, even with an apparently empty tank. Accordingly, a number of tubes or bars of material of approximately the same density as the oil are so disposed in the tank 10 as to radiate from a vicinity more or less vertically below the outlet conection flange 27. In the illustrated example, perforated tubes 29 of polyethylene are provided so that however strong the contact may be between the top wall 11 and the bottom wall 13 in some parts of the tank 10, there is always some communication between other parts of the tank 10 with the outlet connection flange 27 either through the tubes 29 or through channels formed between the top wall 11 and the bottom wall 13 by the interposition of the tubes 29. The provision as to the density of the material of the tubes 29 is to ensure that they do not impose any substantial load on the bottom wall 13 due to their weight.

It may be desirable from time to time to determine the quantity of oil stored in the tank 10.

One convenient method of measuring the quantity of stored oil is by noting the difference between the level of the oil in the tank 10, given by the level of the top wall 11, and the level of water in the rain-water drainage ducts 21 or the pipes 18. By knowing the mean densities of the oil and water the total depth of oil floating on the water may be calculated from the difference in levels. It is necessary to provide a correlation between the depth or head of oil, the height of the top wall 11 of the tank 10 in the pit 15 and the corresponding quantity of oil, to take account of the slope of the walls of the pit 15. Thus, if the measured difference in the levels of an oil of known density, $d_1$ and water of known density $d_2$ is $h$, the total depth or head of oil is given by:

$$L_1 = \frac{d_2 h}{d_2 - d_1}$$

The correlation tables or graph for the pit 15 enable the volume of oil in the tank 10 to be determined for the calculated value of $L_1$ and for the particular level of the top wall 11 in the pit 15 at the time of measurement. The level of the top wall 11 in the pit 15 can be determined from, for instance, the slope of the gangplank 39, and the difference in levels of the water and oil by means of a float in the rigid pipes 18 or in the rain-water drainage ducts 21.

Another convenient method of determining the depth or head $L_1$, of the oil is by measuring the pressure of a gas blown into the oil at approximately the level of the bottom wall 13. Preferably, the gas is an inert gas such as carbon dioxide or nitrogen and is blown in from a tube having one end on the raft 38 and the other end resting lightly on the bottom wall 13 beneath the float 31 so that the gas blown from the tube into the tank is vented to atmosphere via the venting pipe 34. The back pressure of the gas is equal to the hydrostatic pressure of the oil, and a suitable correlation enables the quantity of oil in the tank 10 to be determined from the level of the top wall 11 in the pit 15 and the back pressure of the gas.

When the tank 10 has been completely emptied, it may be folded for transportation or storage.

The tank 10 may be used for storing liquids other than oil products, such as, for example, drinking water. In installations for storing drinking water, it may be convenient to provide sea-water in the layer 23 so that the density of layer 23 exceeds the density of the stored liquid.

It is to be understood that the invention is not limited to the form described in relation to the drawings. For example, the pit 15 and the tank 10 may have shapes other than rectangular, e.g. square or circular. Furthermore, the pit 15 may be wholly formed below the general ground level (for example, in a natural depression) or it may be wholly above the general ground level and be defined entirely by earth works.

It is to be understood that rather than fill and empty the tank from above, the tank 10 may be filled and emptied from a supply line which passes under the tank 10 and terminates in a connection flange attached to and extending through the bottom wall 13, the raft 38 may then be dispensed with if it is not required for other purposes. In this arrangement, it would be preferred that the supply line has a degree of rigidity where it extends downwardly from the connection flange so that it will be self-supporting and will not depend from the bottom wall 13 and thus produce local stresses therein.

An installation according to the invention may be cheaper than conventional above-ground tanks and can be more easily concealed for aesthetic or security reasons. Furthermore, in the case where oil is to be stored, while conventional above-ground tanks are subject to the risk that in the event of fire they might burst and allow their flaming contents to flow over the surrounding terrain, an installation according to the invention enables inflammable products to be stored in an area bounded by secure earth walls, such as the walls 16, or by the ground around the recess or pit containing the tank 10.

During normal use in the installation, the material of the tank 10 will be substantially free of stress, and, as previously herein stated, need only be strong enough to resist the stresses likely to be met during manufacture, handling and transportation. In some instances, a tensile strength of as little as 50 lbs. per inch width may suffice, but it is preferred at the present time to employ materials having tensile strengths in the range 150–300 lbs. per inch width—for example, 250 lbs. per inch width would provide ample strength to support the weight of men carrying out an inspection on the top wall 11 of the tank 10. These tensile strengths contrast with the tensile strengths in the range of 500 to 1,000 lbs. per inch width employed in the largest flexible tanks of previously proposed form. Furthermore, it is difficult with present techniques to provide joints having a tensile strength of greater than about 1,000 lbs. per inch width between adjacent pieces of flexible sheet material, so that even if stronger material could be employed economically, the overall strength of the previously proposed tanks would not be improved.

Let it now be assumed that the density of liquid to be stored, for example oil of specific gravity 1.01, is in excess of the density of liquid, for example water of specific gravity 1, conveniently available to be used outside the tank within the recess. Prior to filling the tank, water is introduced into the recess beneath the tank. The water flows into any depressions there may be in the bottom of the recess, the lining, if there be one, being caused to conform to the bottom surface of the recess by the water. The oil is introduced into the tank and, since the oil is more dense than the water, the tank sinks and displaces the water upwardly around the side walls of the tank and upwardly within the rain-water drainage ducts. Oil is introduced into the tank until the tank is full. Any deep irregularities in the bottom of the recess still contain water at this time. In the absence of the water in the deep irregularities, the material of the bottom might be highly stressed either to conform to the irregularities or to bridge the irregularities. However, assuming that the water in the recess may reach a height $h_2$ within the recess, $h_2$ being not greater than the height of the top wall of the tank when full, and that the depth of oil in the tank is $h_1$ and that $d_2$ is the density of the water and $d_1$ is the density of the oil, then the maximum unbalanced pressure which can occur on the bottom wall of the tank over a hollow depression in the bottom of the recess is given approximately by:

$$h_1 d_1 - h_2 d_2$$

Thus, the bottom wall deforms until stresses are set up therein which counteract the force represented by the pressure differential $(h_1 d_1 - h_2 d_2)$. This is in distinction to a case wherein no water is present in which case, over a hollow depression, the material of the bottom wall would deform until stresses were created therein to counteract the pressure exerted by the head of oil, i.e. $h_1 d_1$, or until the material contacted the surface of the depression.

In the case where the liquid to be stored is denser than the liquid outside the tank within the recess, the facility of detecting leakage of stored liquid is lost but there remains the advantage of reduction of stresses on the flexible sheet material of the tank and hence the ability to use weaker material than has heretofore been possible and the presence of liquid outside the tank, in this instance also, facilitates the straightening of folds in the sheet material of the tank during filling. The advantages attained when the liquid outside the tank has a greater density than the stored liquid may be achieved when liquid readily available for use outside the tank is of lesser density than that of the stored liquid by adding a soluble material, such as common salt to the liquid outside the tank to increase the density of the outside liquid.

If it is required that a tank in accordance with the present invention should be transportable in one piece, then the only limitations upon the capacity of the tank are those imposed by transportation. As an indication, it may be mentioned that a tank in accordance with the present invention and of 15,000 cubic metres capacity may weigh only about 8 tons when empty.

Whilst, in the embodiment particularly described above, the recess is constituted by a man made pit, the recess may be a natural depression in the ground or it may be formed above ground level, perhaps with the ground forming the bottom of the recess and the sides being formed by a permanent or temporary and/or transportable structure.

It will be realised that the provision of the ducts 21 which depress the top wall of the tank around their upper ends and the provision of the vents which tend to raise the top wall around causes the top wall to have an undulating form which assists both flow of rain-water over the top wall of the tank to the ducts and flow of gas under the top of the tank to the vents.

What is claimed is:
1. An installation for storing liquids, comprising:
means defining an upwardly-open recess;
a tank for the liquid to be stored; said tank being received within the recess; said tank having top, side and bottom walls of flexible sheet material; and liquid continuously present within the recess beneath and around the bottom and side walls of the tank when the tank is used for storage purposes, and including
a liquid-impermeable lining for said recess.
2. An installation as claimed in claim 1, wherein:
said lining is formed of flexible sheet material.
3. An installation for storing liquids comprising:
means defining an upwardly-open recess;
a tank for the liquid to be stored; said tank being received within the recess; said tank having top, side and bottom walls of flexible sheet material; and liquid within the recess beneath at least the bottom wall of the tank; and
a liquid-impermeable lining for the recess, said lining being formed of flexible sheet material and being provided with one-way valve means adapted to allow liquid surrounding the recess to flow into the recess when the level of said liquid surrounding the recess is higher than the level of liquid within the recess.
4. An installation for storing liquids, comprising:
means defining an upwardly-open recess;
a tank for the liquid to be stored; said tank being received within the recess; said tank having top, side and bottom walls of flexible sheet material; and liquid within the recess beneath the bottom wall of the tank, and including an outlet from said tank; and
means adapted to provide communication between all regions of the tank and said outlet even when said tank is nearly empty and the top wall is lying on the bottom wall.
5. An installation for storing liquids, comprising:
means defining an upwardly-open recess;
a tank for the liquid to be stored; said tank being received within the recess; said tank having top, side and bottom walls of flexible sheet material; and liquid within the recess beneath the bottom wall of the tank, and including
at least one rigid perforate tubular member extending upwardly between the side wall of the tank and the recess; said rigid tubular member having an upper end accessible from above the installation whereby a sample of the liquid outside the tank within the recess may be drawn from within said rigid tubular member.
6. An installation for storing liquids, comprising:
means defining an upwardly-open recess;
a tank for the liquid to be stored; said tank being received within the recess; said tank having top, side and bottom walls of flexible sheet material; and liquid within the recess beneath the bottom wall of the tank, and including
floats within said tank and connected to said top wall of said tank;
apertures in said top wall above said floats; and
gas venting means associated with said floats; whereby gas within said tank is vented to atmosphere through said apertures in said top wall.
7. An installation for storing liquids, comprising:
means defining an upwardly-open recess;
a tank for the liquid to be stored; said tank being received within the recess; said tank having top, side and bottom walls of flexible sheet material; and liquid within the recess beneath the bottom wall of the tank, and including
a structure extending over the recess for providing a walkway above the top wall of the tank;
a raft floatable on the stored liquid; said structure being supported in part on said raft.
8. An installation as claimed in claim 7, including:
a supply conduit adapted to supply liquid to the interior of said tank;

said supply conduit being mounted on said structure.

9. An installation for storing liquids, comprising:
means defining an upwardly-open recess;
a tank for the liquid to be stored; said tank being received within the recess; said tank having top, side and bottom walls of flexible sheet material; and liquid within the recess beneath the bottom wall of the tank, and including
a flexible duct extending between and sealed to said top and bottom walls of said tank; said duct being adapted to provide a path for flow of rain-water from the top wall of the tank to beneath the bottom wall of the tank;
said duct being adapted to depress the top wall of the tank around the upper end of said duct whereby rain-water on the top wall of the tank flows towards said duct.

10. A tank adapted for installation in a recess comprising:
a top wall;
side walls;
a bottom wall;
said top, side and bottom walls being formed of flexible sheet material; said material forming the side walls being of a strength insufficient to withstand hydrostatic forces of liquid stored in the tank in the absence of external support for the side walls, and including at least one flexible duct extending between said top and bottom walls of the tank; said duct being adapted to provide communication between the exterior of the tank adjacent said top and bottom walls and wherein the weight of said duct is greater than the weight of the quantity of liquid displaced by said duct, whereby said top wall of said tank is depressed when said tank contains liquid.

11. An installation as claimed in claim 1, means for limiting the height of liquid within said recess and wherein said height limiting means communicates with the bottom of said recess.

References Cited

UNITED STATES PATENTS

| | | | |
|---|---|---|---|
| 3,187,793 | 6/1965 | Quase | 220—13 X |
| 2,867,347 | 1/1959 | Champagnat | 220—26 |
| 2,947,147 | 8/1960 | Johnson | 61—.5 |
| 3,052,380 | 9/1962 | Prins | 61—.5 X |
| 2,211,958 | 8/1940 | Mahaffey. | |
| 2,482,468 | 9/1949 | Cranmer. | |
| 2,924,350 | 2/1960 | Greer | 220—18 X |
| 2,987,215 | 6/1961 | Joor. | |
| 3,250,742 | 5/1966 | Nalpas | 150—.5 X |
| 3,260,371 | 7/1966 | Wall | 150—.5 X |
| 3,282,361 | 11/1966 | Mackie | 150—.5 X |

RAPHAEL H. SCHWARTZ, Primary Examiner

U.S. Cl. X.R.

220—13; 61—.5